Sept. 23, 1969　　　W. S. HASLER　　　3,468,172
DRIVE TRANSMISSION MECHANISM
Filed May 22, 1967
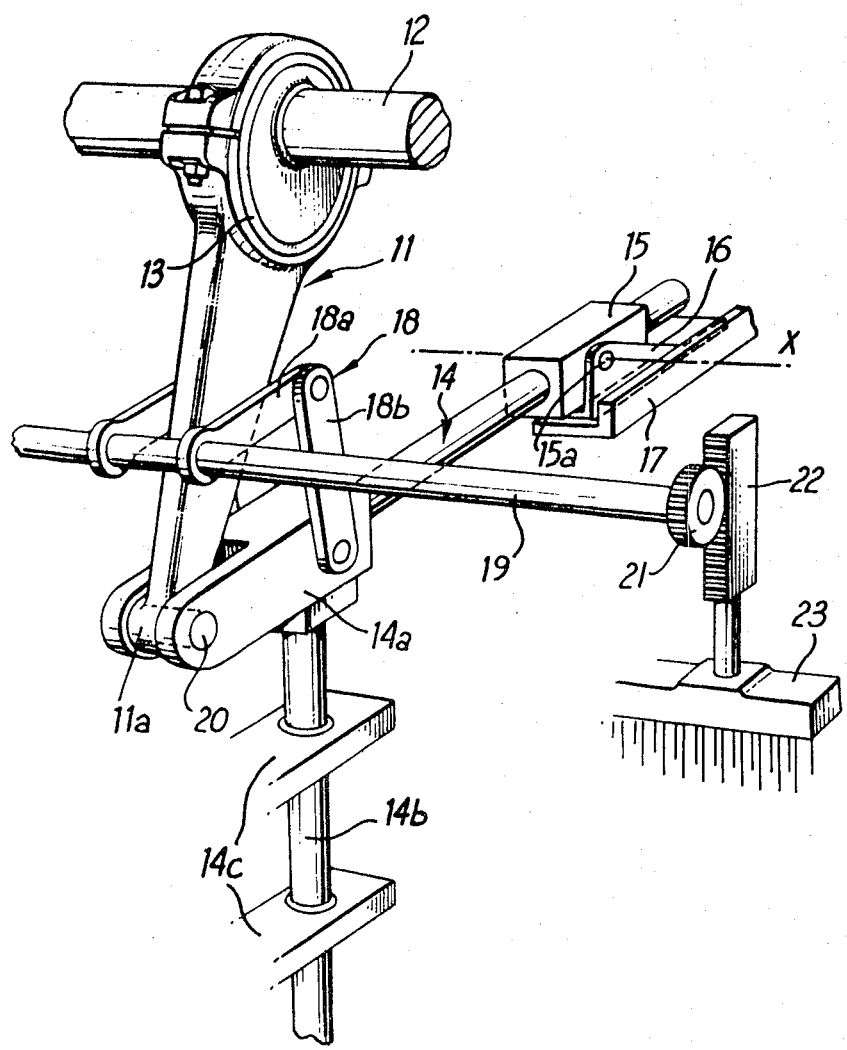
INVENTOR:
William S. Hasler
BY
ATTORNEY

United States Patent Office

3,468,172
Patented Sept. 23, 1969

3,468,172
DRIVE TRANSMISSION MECHANISM
William Sandford Hasler, 16 Queens Road,
Blackburn, England
Filed May 22, 1967, Ser. No. 640,103
Claims priority, application Great Britain, May 22, 1966,
22,745/66
Int. Cl. F16h 19/04, 19/08
U.S. Cl. 74—33                                      5 Claims

ABSTRACT OF THE DISCLOSURE

This disclosure relates to tufting machines and in particular to means for varying the tuft or pile height. The disclosure sets forth a relatively simple and effective means for effecting changes in the needle stroke relative to the working material which is to be penetrated by the needles for depositing tufts therein.

---

The invention concerns a drive transmission mechanism and has more particular reference to a mechanism whereby a cyclical input motion is modified as to amplitude and is transmitted with such modified amplitude.

In a tufting machine for producing floor coverings and like material, in order to given a facility for varying the tuft height in such material it is known to provide an adjustment for the needle stroke. To effect the adjustment is frequently a difficult and time consuming operation and as such is to be avoided.

The primary object of the present invention is to provide a simple yet effective means for effecting the adjustment aforesaid which can be quickly and accurately made with a minimum of effort.

According to the present invention a drive transmission mechanism comprises an intermediate member to which a cyclical input motion is applied as a pivotal motion thereof, a journal structure with which the said member is engaged and by which said member is supported, an output member, a linkage extending between the intermediate member and the output member and remote from the journal structure and a guide means adapted to constrain the intermediate means against motion in the longitudinal direction thereof, the said linkage being drivingly connected to the output member and being adapted to transmit a motion from the intermediate member thereto, the said journal structure being adjustable axially of the intermediate number relative to the linkage.

Preferably, the journal structure is supported in fixed guides for sliding movement relative thereto.

In a preferred structure, the output member comprises a shaft having a pinion gear secured thereto, the said pinion gear being in mesh with a rack and being adapted to effect the reciprocation thereof upon the application of an oscillatory motion to the shaft, the pinion gear will be angularly adjustable on the shaft relative to the rack thereby to allow of an adjustment of the phase relationship between the motion of an element movable with the rack and the input motion.

The invention will now be described further, by way of example only, with reference to the single figure of the accompanying drawing illustrating one embodiment thereof in diagrammatic perspective view.

Thus, referring now to the drawing, a drive transmission mechanism comprises a connecting rod 11 eccentrically mounted upon an input shaft 12 and having a bearing 13 disposed therebetween, a rigid intermediate member 14 having an end 14a thereof freely coupled to the end 11a of the connecting rod, a mounting block 15 freely slidable on the said member 14 and located at that end thereof remote from the connecting rod 11, a journal structure 16 slidably supported on a guide means 17 and having the mounting block 15 pivotally secured thereto, and linkage means 18 extending between the intermediate member 14 and an output shaft 19 adapted to transmit an oscillatory motion of the said member to the said shaft.

The linkage means 18 consists of two spaced parallel assemblies disposed one at each side of the connecting rod 11 and each comprising a first member 18a firmly secured to the output shaft 19 and extending transversely thereof and a second member 18b pivotally secured to the first said member 18a and to the intermediate member 14.

The guide means 17 extends in the axial direction of the intermediate member 14 and receives the journal structure 16 thereupon, such sturcture 16 providing a bearing for a spigot or spigots 15a by which the mounting block 15 is pivotally supported. The journal structure 16 is adjustable relative to the guide means 17 thereby to vary the position of the pivotal axis X of the intermediate member 14 relative to the pivotal connection 20 between the connecting rod 11 and such member 14.

A pinion gear 21 is secured to the end of the output shaft 19 and is in mesh with a rack 22, such rack 22, in its turn, being secured to a needle bar 23 of a tufting machine or other element to be reciprocated.

In use, a drive as applied through the continuously rotating shaft 12, is caused to effect a cyclical pivotal motion of the intermediate member 14 about the pivotal axis for the time being then exiting, and such pivotal motion, through the linkage 18, causes the output shaft 19 to oscillate back and forth with an amplitude determined by the magnitude of the input amplitude, such input amplitude being determined inter alia by the eccentric, and by the relative positions of the pivotal axis of the intermediate member, the point of connection of the linkage means 18 with such member and the pivotal connection 20.

The oscillatory motion of the output shaft 19 is converted into a reciprocatory motion by the co-operating rack and pinion 21, 22, such reciprocatory motion being applied to, say, the needle bar of a tufting machine.

If it is desired to vary the stroke of the reciprocatory motion of the said needle bar, this is effected by adjusting the position of the pivotal axis X of the intermediate member 14 relative to the connection 20 simply by moving the journal structure along the guide means 17. This movement may be effected manually, or alternatively, a servo-motor or like means can be incorporated thereby to facilitate a remote control of the adjustment.

In the context of a tufting machine, not only is it desirable to provide a facility for adjustment of the needle stroke, in the present instance by adjusting the pivotal axis X, but also to allow of a change in the position of the needle stroke relative to a tufting machine needle bed-plate thus to ensure that the top or bottom of such needle stroke remains in a constant position relative to such bed-plate or is adjustable to any required position relative thereto. Such a change is possible on the structure herein described merely by an appropriate adjustment of the pinion relative to the rack, the latter being achieved either by disengaging the pinion 21 from the shaft 19, rotating such pinion and thus moving the rack to a desired position and effecting reengagement, or by disengaging the pinion from the rack, adjusting the position of the rack and reengaging the rack and pinion. A further possibility is to provide an adjustment between the rack and the needle bar.

The invention is not restricted to the exact features of the embodiment hereinbefore described since alternatives will readily present themselves to one skilled in the art. Thus, for example, any convenient alternative to a connecting rod eccentrically mounted on a drive shaft for applying a requisite motion to the intermediate member can be used. The co-operating rack and pinion means for transmitting the motion of the output shaft to the needle bar may, if preferred, by replaced by a linkage mechanism.

In its application, the invention is not limited to the field of tufting machines since the advantages offered by the transmission mechanism may well have application in other fields of industry.

What I claim is:

1. In a tufting machine, a reciprocable needle bar mechanism for penetrating a working material, a first shaft operably connected to said needle bar mechanism for imparting reciprocable motion thereto, a second shaft slidably supported in a pivotable bearing means and connected to a crank drive for oscillating said second shaft about the pivotable bearing means, said second shaft being constrained at a point remote from the pivotable bearing means such that said second shaft is constrained at said point to straight line movement in a direction transverse to the longitudinal axis of said shaft, means connecting said second shaft to said first shaft for oscillating said first shaft in a back and forth movement, and means for adjusting the relative positions between said first and second shafts and said needle bar mechanism such that the penetration stroke of said needle bar relative to the working material can be varied.

2. In a tufting machine as recited in claim 1 further comprising a gearwheel and rack connected between said first shaft and said needle bar mechanism, said gearwheel and rack being disengageable and relatively adjustable for adjusting the penetration stroke of said needle bar mechanism relative to the working material.

3. In a tufting machine as recited in claim 1, wherein said second shaft is supported in a slidable mounting block with said mounting block being pivotally supported on a journal structure.

4. In a tufting machine as recited in claim 3, wherein the pivot axis of said slidable mounting block is adjustable relative to said second shaft for varying the magnitude of the straight line movement of said second shaft.

5. In a tufting machine as recited in claim 1, wherein said means connecting said first shaft and said second shaft includes linkage means for converting straight line movement of said second shaft to back and forth movement of said first shaft.

References Cited

UNITED STATES PATENTS

| 534,464 | 2/1895 | Bowser | 74—422 |
| 560,056 | 5/1896 | Arnold | 74—422 |
| 2,499,473 | 3/1950 | Elder | 74—33 |

FRED C. MATTERN, Jr., Primary Examiner

W. S. RATLIFF, Jr., Assistant Examiner

U.S. Cl. X.R.

74—422